US012795004B2

(12) United States Patent
Lin et al.

(10) Patent No.: US 12,795,004 B2
(45) Date of Patent: Nov. 10, 2026

(54) ROTATING SHAFT MECHANISM AND ELECTRONIC DEVICE

(71) Applicant: HUAWEI TECHNOLOGIES CO., LTD., Guangdong (CN)

(72) Inventors: Yangming Lin, Dongguan (CN); Leilei Hua, Shanghai (CN); Qiang Zhan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 18/675,727

(22) Filed: May 28, 2024

(65) Prior Publication Data

US 2024/0323269 A1 Sep. 26, 2024

Related U.S. Application Data

(63) Continuation of application No. PCT/CN2022/134409, filed on Nov. 25, 2022.

(30) Foreign Application Priority Data

Nov. 29, 2021 (CN) ......................... 202111473512.6

(51) Int. Cl.
*H04M 1/02* (2006.01)
*E05D 3/12* (2006.01)

(52) U.S. Cl.
CPC ....... *H04M 1/0214* (2013.01); *H04M 1/0268* (2013.01); *E05D 3/122* (2013.01)

(58) Field of Classification Search
CPC .... H04M 1/0214; H04M 1/0268; E05D 3/122
See application file for complete search history.

(56) References Cited

U.S. PATENT DOCUMENTS

| | | | | |
|---|---|---|---|---|
| 10,274,996 B2 * | 4/2019 | Lin | G06F 1/1652 |
| 2009/0233658 A1 * | 9/2009 | Murayama | H04M 1/022 455/575.3 |
| 2010/0005627 A1 * | 1/2010 | Endo | H04M 1/0222 16/367 |
| 2018/0275725 A1 * | 9/2018 | Lin | H04M 1/0268 |
| 2020/0304613 A1 * | 9/2020 | Cha | G06F 1/1652 |
| 2021/0081005 A1 * | 3/2021 | Huang | G06F 1/1618 |
| 2021/0204429 A1 * | 7/2021 | Zhang | H04M 1/0216 |

* cited by examiner

*Primary Examiner* — Raymond S Dean
(74) *Attorney, Agent, or Firm* — Fish & Richardson P.C.

(57) ABSTRACT

A rotating shaft mechanism and an electronic device comprising the rotating shaft mechanism are provided. In an implementation, the rotating shaft mechanism includes a base, a first driving part, a guiding part, and a second driving part. The base includes a fastener and two first rotating arms. The fastener is fastened to the base. One end of each first rotating arm is rotatively connected to the fastener, and the other end is fastened to a middle frame. The guiding part includes two guiding blocks. Each guiding block is rotatively connected to the base, each guiding block corresponds to one first rotating arm, and the guiding block is linked to the first rotating arm. The second driving part includes two second rotating arms, the second rotating arm is fastened to a casing, and the second rotating arm is linked to the guiding block.

20 Claims, 5 Drawing Sheets

ROTATING SHAFT MECHANISM AND ELECTRONIC DEVICE

CROSS-REFERENCE TO RELATED APPLICATIONS

This application is a continuation of International Application No. PCT/CN2022/134409, filed on Nov. 25, 2022, which claims priority to Chinese Patent Application No. 202111473512.6, filed on Nov. 29, 2021. The disclosures of the aforementioned applications are hereby incorporated by reference in their entireties.

TECHNICAL FIELD

This application relates to the field of electronic device technologies, and in particular, to a rotating shaft mechanism and an electronic device.

BACKGROUND

A foldable mobile terminal (for example, an electronic device such as a foldable mobile phone, a foldable tablet, or a foldable computer) needs to meet high reliability, good operation experience, and a good appearance design. In the foldable mobile terminal, a flexible display is continuously foldable. In a process in which the flexible display synchronously moves with a casing to be folded, a bending part has a large deformation amount. In addition, two parts of the flexible display are approximately parallel, so that the bending part of the flexible display has large curvature. Consequently, the flexible display has an obvious crease. If the curvature of the bending part of the flexible display is reduced through relative translation of two parts of the casing, an appearance of the mobile terminal is seriously affected.

SUMMARY

This application provides a rotating shaft mechanism and an electronic device, so that a flexible display and a casing have different rotation angles.

A first aspect of embodiments of this application provides a rotating shaft mechanism, used in a foldable electronic device. The electronic device includes a flexible display and two housings. The housing includes a casing and a middle frame. The two casings are rotativity connected. The middle frame is rotativity connected to the casing. The flexible display is laid on a surface of the middle frame. The rotating shaft mechanism includes a base, a first driving part, a guiding part, and a second driving part. The first driving part includes a fastener and two first rotating arms. The two first rotating arms are distributed on two sides of the base. The fastener is fastened to the base. One end of each first rotating arm is rotativity connected to the fastener, and the other end is configured to be fastened to the middle frame. The first rotating arm includes a first sliding part. The guiding part includes two guiding blocks. Each guiding block is rotativity connected to the base. Each guiding block corresponds to one first rotating arm on a same side. The guiding block includes a second sliding part in slidable fit with the first sliding part. The first sliding part and the second sliding part fit to guide a relative motion of the guiding block and the first rotating arm. The guiding block further includes a third sliding part. The second driving part includes two second rotating arms. The second rotating arm is configured to be fastened to the casing. The two second rotating arms are distributed on the two sides of the base. Each second rotating arm corresponds to one guiding block on a same side. The second rotating arm includes a fourth sliding part in slidable fit with the third sliding part. The third sliding part and the fourth sliding part fit to guide a relative motion of the guiding block and the second rotating arm. When the two second rotating arms relatively rotate from a first relative location to a second relative location, the two casings are capable of being driven to switch from being unfolded to being folded, the guiding part drives the two first rotating arms to rotate relative to each other, and relative rotation angles of the two first rotating arms are greater than relative rotation angles of the two second rotating arms. When the two casings are unfolded, the two middle frames are disposed on a same surface, and when the two casings are folded, the two middle frames are expanded at an end close to the base.

In the rotating shaft mechanism, the first rotating arm and the second rotating arm are linked by using the guiding part, and the first rotating arm and the second rotating arm can rotate synchronously. However, the rotation angles of the first rotating arm and the second rotating arm are different. Specifically, the rotation angle of the first rotating arm is greater than the rotation angle of the second rotating arm. In this way, when the casing driven by the second rotating arm rotates to fold, the middle frame driven by the second rotating arm can have a specific angle. In other words, the middle frames are in a shape of an expanded opening at the end close to the base, so that the flexible display connected to the middle frame implements arc transition at a bending position with a large arc angle. This can reduce a wrinkle of the flexible display, and alleviate a light shadow phenomenon of a crease of the flexible display. Herein, the middle frames are in the shape of the expanded opening at the end close to the base. In other words, a relative distance between the two middle frames at the end close to the base is greater than a relative distance between the two middle frames at an end away from the base.

Based on the first aspect, in a possible implementation, the first rotating arm is provided with an arc groove, and the fastener is provided with an arc block. The arc block is in slidable fit with the arc groove, to enable the first rotating arm to be rotativity connected to the fastener.

In this possible implementation, the rotating shaft mechanism can implement a rotation connection between the first rotating arm and the fastener by using the slidable fit between the arc block and the arc groove. In addition, both the arc block and the arc groove may be set to be in poor arcs, so that the middle frame can be disposed in a location below a rotating shaft of the first rotating arm and the fastener that rotate relative to each other, and the first rotating arm can further drive the middle frame to rotate substantially by more than 90 degrees.

Based on the first aspect, in a possible implementation, one of the first sliding part and the second sliding part is a first sliding groove, and the other is a first sliding block; and one of the third sliding part and the fourth sliding part is a second sliding groove, and the other is a second sliding block.

In this possible implementation, the first sliding groove and the second sliding groove of the rotating shaft mechanism may be disposed based on a relative motion relationship needed by the first rotating arm and the second rotating arm. After shapes of the first sliding groove and the second sliding groove are determined, when the second rotating arm rotates, the guiding block may drive the first rotating arm to move based on a preset track. Forms of the sliding block and the sliding groove facilitate assembly of the first driving part, the guiding part, and the second driving part.

Based on the first aspect, in a possible implementation, the first sliding groove includes a first segment and a second segment that are consecutive, and the second sliding groove includes a third segment and a fourth segment that are consecutive. When the two second rotating arms rotate relative to each other to enable ends that are of the two second rotating arms and that are away from each other to be relatively close to each other, the first sliding block enters the second segment from the first segment, and the second sliding block enters the fourth segment from the third segment. The first sliding groove and the second sliding groove are disposed as follows: when the first sliding block slides in the first segment, the second sliding block slides in the third segment, and a rotation speed of the first rotating arm is equal to a rotation speed of the second rotating arm.

In this possible implementation, when the first sliding block slides in the first segment, the second sliding block slides in the third segment synchronously. In this case, rotation speeds of the first rotating arm and the second rotating arm are approximately the same. A difference between the rotation speeds of the first rotating arm and the second rotating arm is within 5%. In this form, the middle frame driven by the first rotating arm and the casing driven by the second rotating arm have a smoother and more stable relative motion, and a user is unlikely to observe the relative motion of the middle frame and the casing, so that unfolding and folding processes can be more beautiful.

Based on the first aspect, in a possible implementation, when the first sliding block slides in the third segment, the second sliding block slides in the fourth segment, to enable relative rotation speeds of the two first rotating arms to be greater than relative rotation speeds of the two second rotating arms.

In this possible implementation, the first sliding block slides in the second segment and the second sliding block slides in the fourth segment, so that relative rotation of the first rotating arm and the second rotating arm is controlled. In a phase in which the first sliding block slides in the second segment and the second sliding block slides in the fourth segment, the rotation speed of the first rotating arm is always greater than the rotation speed of the second rotating arm, so that a total rotation angle of the first rotating arm is greater than a total rotation angle of the second rotating arm, and the first rotating arm and the second rotating arm have a smoother and more stable relative motion.

Based on the first aspect, in a possible implementation, the rotating shaft mechanism further includes a synchronization assembly. The synchronization assembly is connected to the two guiding blocks through transmission, and is configured to implement synchronous reverse rotation of the two guiding blocks.

In this possible implementation, the synchronization assembly enables the two guiding blocks to synchronously and reversely move, and can also drive the two first rotating arms to synchronously move and the two second rotating arms to synchronously move.

Based on the first aspect, in a possible implementation, the synchronization assembly includes two engaged synchronization gears. The two synchronization gears are in a one-to-one correspondence with the two guiding blocks, and the synchronization gears are fastened to the corresponding guiding blocks.

In this possible implementation, a synchronous motion of the two guiding blocks is implemented by using engagement of the two synchronization gears, so that synchronous transmission connection of the two guiding blocks is more stable, and the two synchronization gears are not prone to slipping. Therefore, the synchronous motion of the two guiding blocks is not prone to failing.

Based on the first aspect, in a possible implementation, the synchronization assembly further includes an even quantity of linkage gears, and the two synchronization gears are engaged by using the even quantity of linkage gears.

In this possible implementation, the even quantity of linkage gears are added, so that reference circles of the synchronization gear and the linkage gear are designed to be small, and do not occupy a spatial location.

Based on the first aspect, in a possible implementation, the rotating shaft mechanism further includes a damping assembly. The damping assembly is connected to the guiding block through transmission, and is configured to provide a damping force when the two guiding blocks rotate relative to each other.

In this possible implementation, the damping force provided by the damping assembly may enable the two second rotating arms to stabilize in the first relative location and/or the second relative location.

Based on the first aspect, in a possible implementation, the damping assembly includes a first cam member, a second cam member, and an elastic damping member. A first protrusion is disposed on a surface that is of the first cam member and that faces the second cam member, and a first groove that fits the first protrusion is disposed on the second cam. One of the first cam member and the second cam member is connected to the base in a circumferential location-limiting manner, and the other drivingly fits the guiding block, and is capable of synchronously rotating with the guiding block. The elastic damping member is configured to provide an elastic force for the first cam member and the second cam member to be relatively close to each other. In a process in which the two second rotating arms relatively rotate from the first relative location to the second relative location, the first protrusion slides out of the first groove.

In this possible implementation, the damping assembly is in a form of fitting of the first protrusion and the first groove, so that when the two second rotating arms are in the first relative location, the two second rotating arms can be relatively stable in the first relative location. In this case, the two first rotating arms can also have a relatively stable relative location. Specific torque needs to be applied to the two second rotating arms, to overcome the elastic force of the elastic damping member, and to enable the first protrusion to slide out of the first groove. In other words, the specific torque needs to be applied to enable the two second rotating arms to move from the first relative location to the second relative location.

Based on the first aspect, in a possible implementation, a second protrusion is disposed on the surface that is of the first cam member and that faces the second cam member, and a second groove that fits the second protrusion is disposed on the second cam. In a process in which the two second rotating arms relatively rotate from the second relative location to the first relative location, the second protrusion slides out of the second groove.

In this possible implementation, the damping assembly is in a form of fitting of the second protrusion and the second groove, so that when the two second rotating arms are in the second relative location, the two second rotating arms can be relatively stable in the second relative location. In this case, the two first rotating arms can also have a relatively stable relative location. Specific torque needs to be applied to the two second rotating arms, to overcome the elastic force of the elastic damping member, and to enable the second protrusion to slide out of the second groove. In other words, the specific torque needs to be applied to enable the two second rotating arms to move from the second relative location to the first relative location.

Based on the first aspect, in a possible implementation, the rotating shaft mechanism further includes two elastic screen members, one end of the elastic screen member is connected to the guiding block, the other end is configured to be connected to the middle frame, and the elastic screen member enables the middle frame to tend to be away from the guiding block.

In this possible implementation, the elastic screen member enables the two middle frames to tend to be relatively away from each other, so that the flexible display on the middle frame is tightened, and the flexible display remains flat. In this way, installation of the flexible display can be facilitated, and the flexible display can be kept flat when the casing is unfolded.

A second aspect of embodiments of this application provides an electronic device, including a flexible display, the rotating shaft mechanism provided in any implementation of the first aspect, and two housings. The housing includes a casing and a middle frame, the two casings are rotativity connected, and the middle frame is rotativity connected to the casing. One part of the flexible display is connected to one middle frame, and the other part is connected to the other middle frame. One first rotating arm in the rotating shaft mechanism is fastened to one middle frame, and the other first rotating arm is fastened to the other middle frame. One second rotating arm in the rotating shaft mechanism is fastened to one casing, and the other second rotating arm is fastened to the other casing.

The two housings in the electronic device control rotation by using the rotating shaft mechanism, so that the casing and the middle frame have different rotation angles. The middle frame is connected to the flexible display. When the two casings rotate to fold, that is, the two casings have an included angle of 180 degrees, because the rotation angle of the middle frame is greater than the rotation angle of the casing, the flexible display in the middle frame has an included angle greater than 180 degrees at a bending position, and the middle frame and the casing rotate by a specific angle to match an angle difference between the casing and the middle frame, so that the flexible display can implement smooth transition at the bending position. This reduces a wrinkle of the flexible display, and alleviates a light shadow phenomenon of a crease of the flexible display.

Based on the second aspect, in a possible implementation, the housing further includes a rotating shaft. The rotating shaft is rotativity disposed at an end that is of the casing and that is away from the rotating shaft mechanism, and the middle frame rotativity fits the rotating shaft.

In this possible implementation, relative rotation of the casing and the middle frame is implemented by using the separate rotating shaft. This facilitates assembly of the casing and the middle frame.

DESCRIPTION OF REFERENCE SIGNS OF MAIN COMPONENTS

Figure 1:
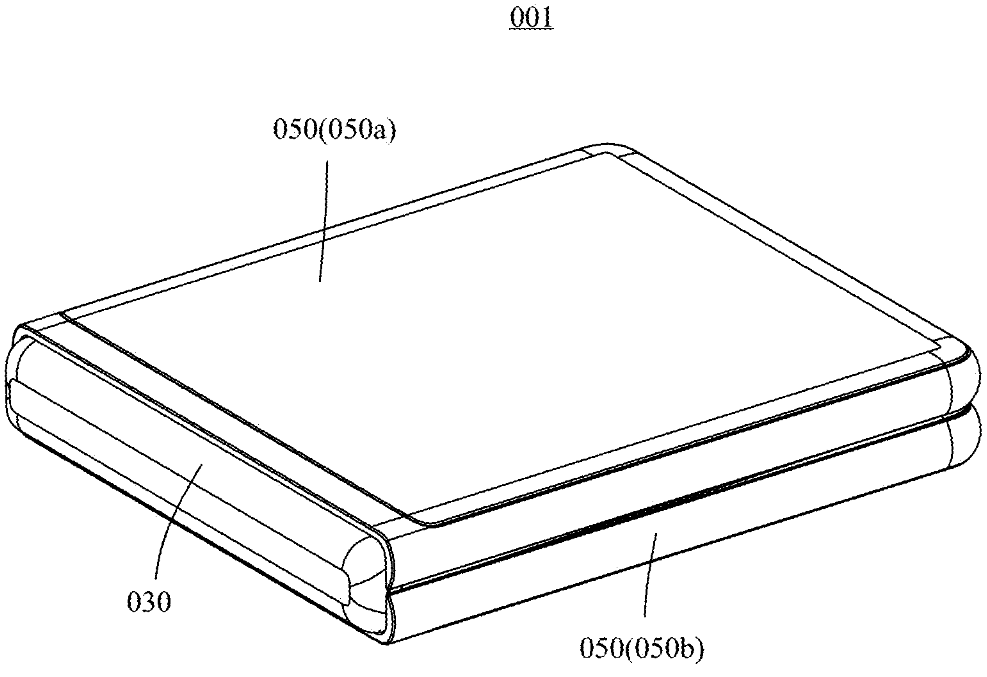
FIG. 1 is a schematic diagram of a structure of a foldable mobile terminal, where two housings are in a folded state.

Mobile terminal and electronic device 001
Flexible display 010
Rotating shaft mechanism 030
Housing 050
First housing 050*a*
Second housing 050*b*
Casing 051
First casing 051*a*
Second casing 051*b*
Middle frame 053
First middle frame 053*a*
Second middle frame 053*b*
Rotating shaft 055
Base 100
First installation base 110
Second installation base 130
First driving part 200
Fastener 210
Arc groove 231
First rotating arm 230
Arc block 211
First sliding groove 233
First segment 2331
Second segment 2333
First bolt 250
Second bolt 270
Guiding part 300
Guiding block 310
First sliding block 311
Second sliding block 313
Second driving part 400
Second rotating arm 410
Second sliding groove 411
Third segment 4111
Fourth segment 4113
Door plate 500
Synchronization gear 610
Linkage gear 630
First cam member 710
First protrusion 711
Second protrusion 713

Second cam member 730

First groove 731

Second groove 733

Elastic damping member 750

Elastic screen member 800.

This application is further described in the following specific implementations with reference to the foregoing accompanying drawings.

DESCRIPTION OF EMBODIMENTS

Implementations of this application are described below in specific embodiments, and other advantages and effects of this application may be readily understood by a person skilled in the art from content disclosed in this specification. Although description of this application is provided with reference to examples of embodiments, this does not mean that features of this application are limited to this implementation. On the contrary, a purpose of the description of this application with reference to implementations is to cover another option or modification that may be derived according to claims of this application. For an in-depth understanding of this application, the following descriptions include a plurality of specific details. This application may be alternatively implemented without using these details. In addition, to avoid confusion or obfuscation of a focus of this application, some specific details are omitted from the description. It should be noted that embodiments of this application and the features in embodiments may be mutually combined in a case of no conflict.

The following terms "first", "second", and the like are merely used for description, and shall not be understood as an indication or implication of relative importance or implicit indication of a quantity of indicated technical features. Therefore, a feature limited by "first", "second" and the like may explicitly indicate or implicitly include one or more such features. In description of this application, unless otherwise stated, "a plurality of" means two or more than two. Orientation terms such as "up", "down", "left", "right", and the like are defined with respect to orientations of components that are schematically placed in accompanying drawings, and it should be understood that these directional terms are relative concepts, are used for relative description and clarification, and may vary accordingly based on a change in the orientation in which the components are disposed in the accompanying drawings.

In this application, if used, unless otherwise expressly specified and limited, the term "connection" should be understood in a broad sense. For example, a "connection" may be a fixed connection, a detachable connection, or an integral connection; or a direct connection, or an indirect connection through an intermediate medium. As used in this specification, the term "and/or" includes any combination and all combinations of one or more related listed items.

When the following embodiments are described in detail with reference to schematic diagrams, for ease of description, a diagram indicating a partial structure of a device is not partially enlarged in accordance with a general scale. In addition, the schematic diagrams are merely examples, and should not limit a protection scope of this application.

To make the objectives, technical solutions, and advantages of this application clearer, the following further describes the implementations of this application in detail with reference to the accompanying drawings.

To facilitate understanding of a rotating shaft mechanism provided in embodiments of this application, the following first describes an application scenario.

FIG. 1 is a schematic diagram of a structure of a foldable mobile terminal. Two housings 050 are in a folded state.

As shown in FIG. 1, a rotating shaft mechanism 030 provided in this embodiment of this application can be used in the foldable mobile terminal 001. The foldable mobile terminal 001 specifically includes two parts that rotate relative to each other, and a form of the foldable mobile terminal 001 is changed through folding, rotating, or the like of the two parts. In different use requirement conditions, a user may fold and unfold the mobile terminal 001 to meet different requirements of the user. When the user needs to carry the mobile terminal 001, the user may fold the mobile terminal 001 to reduce a size of the mobile terminal 001. This improves portability. When using the mobile terminal 001, the user may unfold the mobile terminal 001 to provide a larger display region and operation region. This improves use convenience. During actual application, the mobile terminal 001 may be classified into a plurality of types, for example, may be specifically a mobile phone, a tablet computer, a notebook computer, an e-book, or the like.

A mobile phone is used as an example. The mobile phone may include the two housings 050 connected through the rotating shaft mechanism 030. Under an action of the rotating shaft mechanism 030, relative rotation, relative movement, and other motions can be generated between the two housings 050. The housing 050 includes a casing and a middle frame. The middle frame is disposed on an inner side of the casing, and a flexible display (for example, an OLED screen) may be disposed on surfaces of two middle frames. When the mobile phone is unfolded, surfaces that are of the two housings 050 and on which the flexible display is disposed are approximately flush with each other, and the flexible display is laid on the surfaces of the two housings 050, to provide a large display area and operation region and improve use performance. After the mobile phone is folded, the flexible display is also bent, and the flexible display may be wrapped between the rotating shaft mechanism 030 and the two housings 050, to provide a good protection function for the flexible display, thereby preventing the flexible display from being damaged under an external force and improving security performance of the mobile phone.

If the flexible display synchronously moves with the casings, when the two casings move by 180 degrees relative to each other from being unfolded to being folded, two parts of the flexible display also move by 180 degrees relative to each other. As a result, the two parts of the flexible display are bent to a parallel location, and arc transition with a quite small radius exists in a bending part. Consequently, a local stress of the flexible display is large, and an obvious crease is formed when the flexible display is bent repeatedly.

Figure 2:
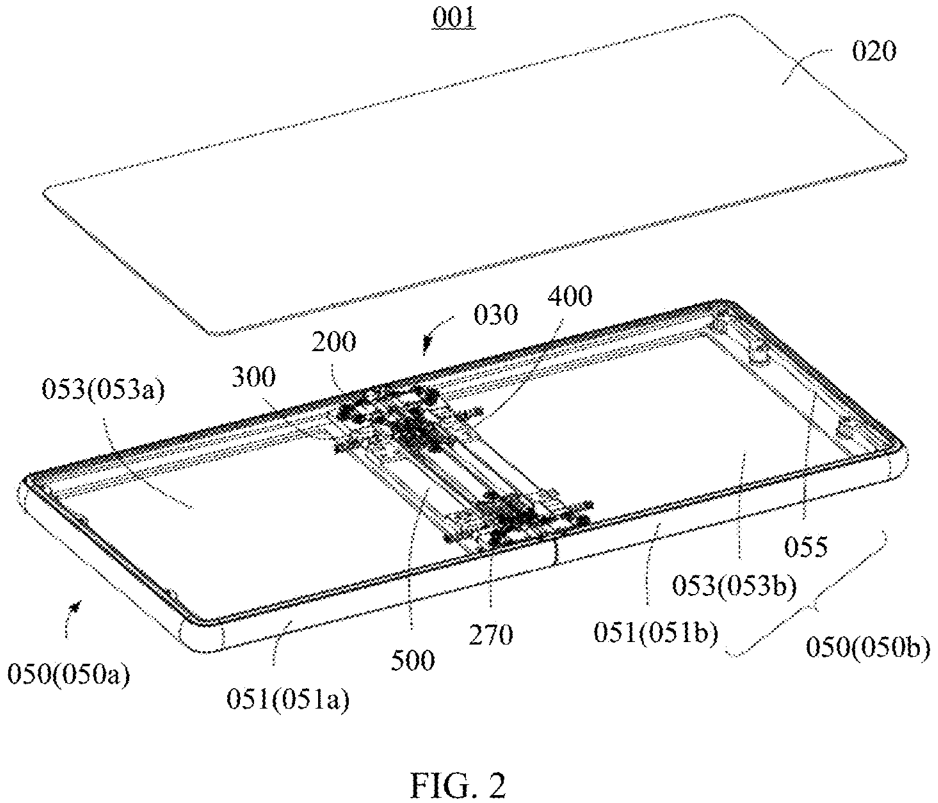
FIG. 2 is an exploded view of an electronic device according to an embodiment of this application, where two housings are in an unfolded state, a flexible display is in an unfolded state, and a rotating shaft mechanism corresponds to the unfolded state of the flexible display, that is, two second rotating arms are in a first relative location.

FIG. 2 is an exploded view of an electronic device according to an implementation of this application. Two housings 050 are in an unfolded state, a flexible display 010 is in an unfolded state, and a rotating shaft mechanism 030 corresponds to the unfolded state of the flexible display 010, that is, two second rotating arms 410 are in a first relative location.

Figure 3:
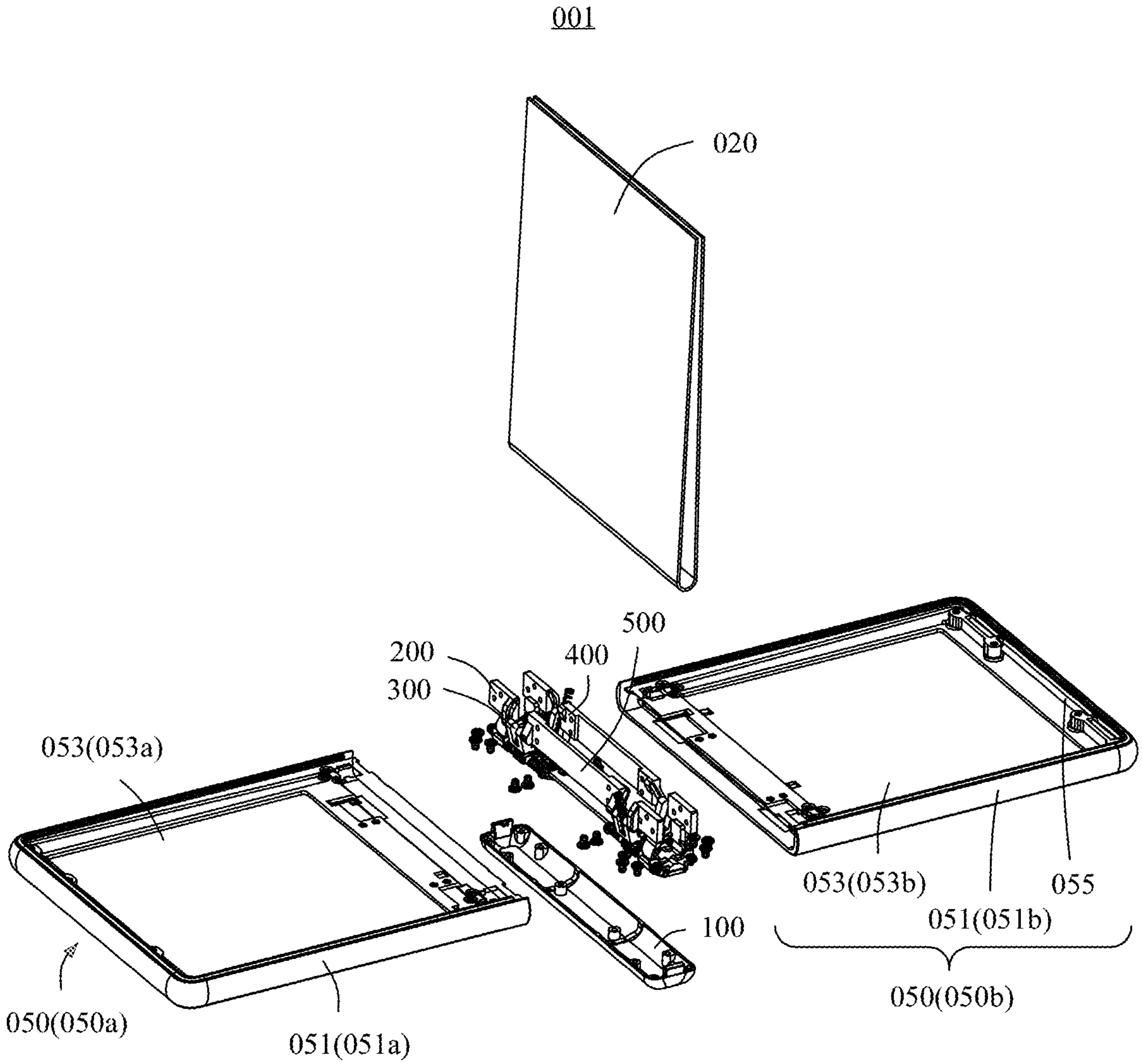
FIG. 3 is an exploded view of an electronic device according to an embodiment of this application, where two housings are in an unfolded state, a flexible display is in a folded state, and a rotating shaft mechanism corresponds to the folded state of the flexible display, that is, two second rotating arms are in a second relative location.

FIG. 3 is an exploded view of the electronic device according to an implementation of this application. The two housings 050 are in an unfolded state, the flexible display 010 is in a folded state, and the rotating shaft mechanism 030 corresponds to the folded state of the flexible display 010, that is, the two second rotating arms 410 are in a second relative location.

As shown in FIG. 2 and FIG. 3, the electronic device is a mobile phone. The electronic device includes the flexible display 010, the rotating shaft mechanism 030, and the two housings 050.

The two housings 050 are symmetrically disposed on two sides of the rotating shaft mechanism 030, and the rotating shaft mechanism 030 drives the two housings 050 to rotate relative to each other.

Each housing 050 includes a casing 051 and a middle frame 053 (processed in a transparent manner in the figure). The casing 051 has an accommodation cavity, and the middle frame 053 is disposed at an opening of the accommodation cavity. The housing 050 further includes a rotating shaft 055. A guiding groove is disposed at an end that is of the casing 051 and that is away from the rotating shaft mechanism 030. The rotating shaft 055 rotativity fits the casing 051 by using the guiding groove. The middle frame 053 is rotativity connected to the rotating shaft 055. The casing 051 rotativity fits the middle frame 053 by using the rotating shaft 055. As the middle frame 053 and the casing 051 rotate relative to each other, a side that is of the middle frame 053 and that is close to the rotating shaft mechanism 030 can sink into the accommodation cavity.

For ease of description, the two housings 050 are respectively named a first housing **050*a* and a second housing 050*b*. Correspondingly, a casing 051 of the first housing 050*a* is a first casing 051*a*, and a middle frame 053 of the first housing 050*a* is a first middle frame 053*a*; and a casing 051 of the second housing 050*b* is a second casing 051*b*, and a middle frame 053 of the second housing 050*b* is a second middle frame 053*b*. The flexible display 010 is fastened to a surface that is of the middle frame 053 and that is away from the accommodation cavity. Specifically, one part of the flexible display 010 is fastened to the first middle frame 053*a*, and the other part is fastened to the second middle frame 053*b*. The first housing 050*a* and the second housing 050*b* rotate relative to each other, so that the flexible display 010 may switch between the unfolded state and the bent state. The guiding groove further extends from being close to the rotating shaft mechanism 030 to being away from the rotating shaft mechanism 030 by a specific amount, and the rotating shaft 055 can slide in the guiding groove, so that the middle frame 053 can be further close to or away from the rotating shaft mechanism 030. The middle frame 053 can be relatively close to or away from the rotating shaft mechanism 030, so that the flexible display 010 can be conveniently installed, and the flexible display 010** can be smoothly unfolded.

Figure 4:
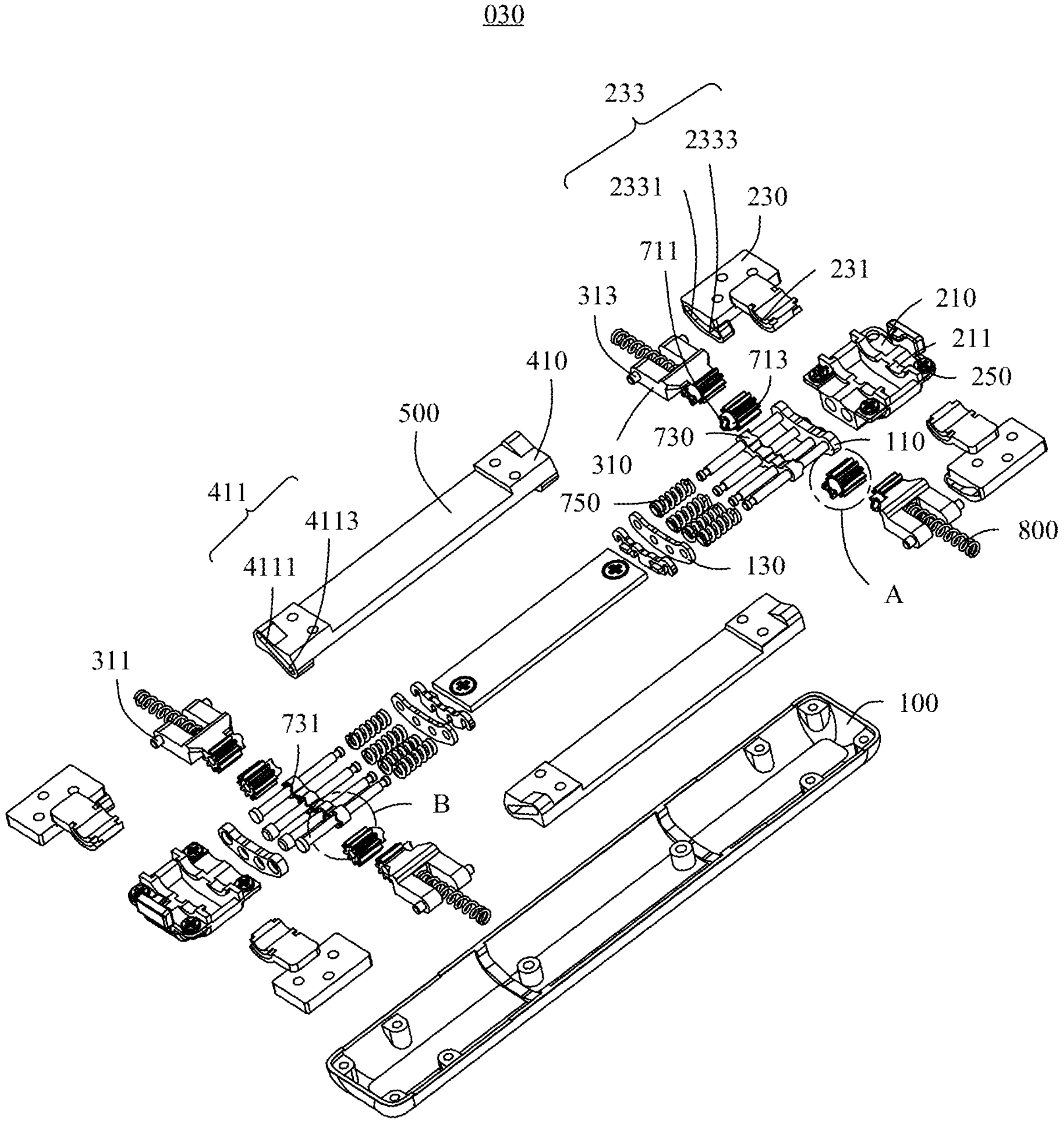
FIG. 4 is an exploded view of a rotating shaft mechanism according to an embodiment of this application.

FIG. 4 is an exploded view of the rotating shaft mechanism 030 according to an implementation of this application.

As shown in FIG. 4, the rotating shaft mechanism 030 includes a base 100, a first driving part 200, a guiding part 300, and a second driving part 400. The base 100 is approximately in a long strip shape, the base 100 has an installation cavity, and the first driving part 200, the guiding part 300, and the second driving part 400 are all at least partially accommodated in the installation cavity.

Refer to FIG. 3 and FIG. 4. The first casing **051*a* has a first backplane, the second casing 051*b* has a second backplane, and the first backplane, the second backplane, and the base 100 jointly form a surface that is of the electronic device and that is away from the flexible display 010. When the first housing 050*a* and the second housing 050*b* are unfolded, the first backplane, the base 100**, and the second backplane are continuous, so that the electronic device has a good appearance, and the electronic device can also have good dust-proof performance.

Figure 5:
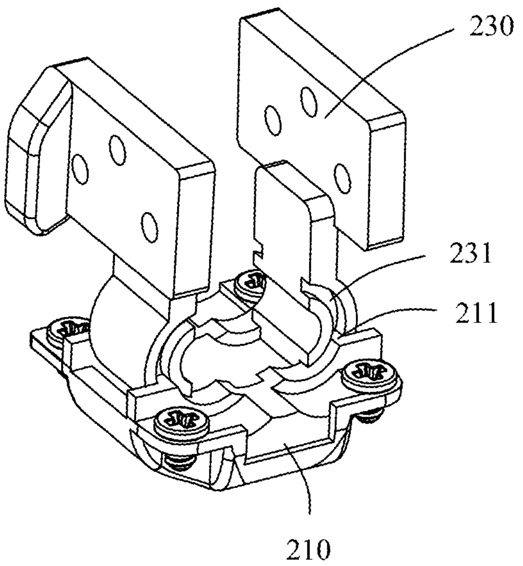
FIG. 5 is a schematic diagram of a structure of a first driving part according to an embodiment of this application, where two first rotating arms are in an unfolded state.

FIG. 5 is a schematic diagram of a structure of the first driving part 200 according to an implementation of this application, where two first rotating arms 230 are in an unfolded state.

Figure 6:
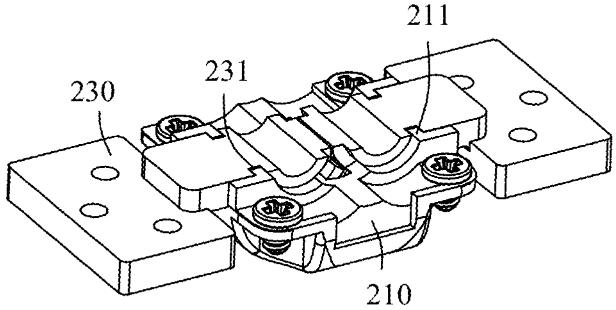
FIG. 6 is a schematic diagram of a structure of a first driving part according to an embodiment of this application, where two first rotating arms are in a folded state.

FIG. 6 is a schematic diagram of a structure of the first driving part 200 according to an implementation of this application, where the two first rotating arms 230 are in a folded state.

As shown in FIG. 5 and FIG. 6, the first driving part 200 includes a fastener 210 and the two first rotating arms 230. The fastener 210 is fastened to the base 100 through a first bolt 250. The fastener 210 is provided with two arc blocks 211, and the two arc blocks 211 are symmetrically located on two sides of the fastener 210. The first rotating arm 230 is provided with an arc groove 231, and the arc block 211 is slidably disposed in the arc groove 231. The arc block 211 slides in the arc groove 231, so that the first rotating arm 230 can rotate relative to the fastener 210. In forms of the arc groove 231 and the arc block 211, a rotating shaft of the first rotating arm 230 that rotates around the fastener 210 is located outside the fastener 210.

Refer to FIG. 3 and FIG. 4. One end that is of the first rotating arm 230 and that is away from the fastener 210 is fastened to the middle frame 053 through a second bolt 270. When the first rotating arm 230 rotates relative to the fastener 210, the middle frame 053 is driven to rotate relative to the fastener 210.

The first rotating arm 230 includes a first sliding part, and the first sliding part is disposed close to the guiding part 300 and is configured to drive the guiding part 300 to move.

Refer to FIG. 4. The guiding part 300 includes a first installation base 110 and two guiding blocks 310. The first installation base 110 is fastened to the base 100, and the guiding block 310 rotativity fits the first installation base 110, so that the guiding block 310 is rotativity connected to the base 100. Each guiding block 310 corresponds to one first rotating arm 230. The guiding block 310 includes a second sliding part, and the second sliding part is in slidable fit with the first sliding part. When the first rotating arm 230 rotates relative to the fastener 210, the slidable fit between the first sliding part and the second sliding part enables the guiding block 310 to rotate relative to the base 100.

The first sliding part is a first sliding groove 233, and the second sliding part is a first sliding block 311. The first sliding groove 233 extends in a direction from being close to the fastener 210 to being away from the fastener 210, the first sliding block 311 is a cylindrical sliding block, and the first sliding block 311 may slide in the extension direction of the first sliding groove 233 and may rotate in the first sliding groove 233. When the first rotating arm 230 rotates relative to the fastener 210, the first sliding block 311 slides in the first sliding groove 233 to drive the guiding part 300 to rotate relative to the base 100.

The guiding block 310 further includes a third sliding part, and the third sliding part is located on a side that is of the guiding block 310 and that is away from the first rotating arm 230, and is configured to drive the second driving part 400 to move.

The second driving part 400 includes the two second rotating arms 410. Each second rotating arm 410 corresponds to one guiding block 310. The second rotating arm 410 includes a fourth sliding part, and the fourth sliding part is in slidable fit with the third sliding part. When the guiding block 310 rotates relative to the base 100, the slidable fit between the third sliding part and the fourth sliding part enables the second rotating arm 410 to rotate relative to the base 100.

The third sliding part is a second sliding block 313, and the fourth sliding part is a second sliding groove 411. The first sliding groove 233 extends in a direction from being close to the base 100 to being away from the base 100, the second sliding block 313 is a cylindrical sliding block, and the second sliding block 313 may slide in an extension direction of the second sliding groove 411 and may rotate in the second sliding groove 411. When the guiding block 310 rotates relative to the base 100, the second sliding block 313 slides in the second sliding groove 411 to drive the second rotating arm 410 to rotate relative to the base 100.

Figure 7:
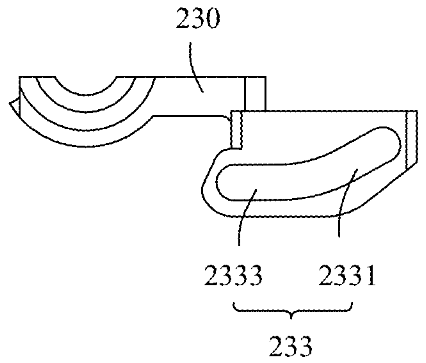
FIG. 7 is a schematic diagram of a structure of a first rotating arm according to an embodiment of this application.

FIG. 7 is a schematic diagram of a structure of the first rotating arm 230 according to an implementation of this application.

Refer to FIG. 4 and FIG. 7, shape designs of the first sliding groove 233 and the second sliding groove 411 may control relative rotation speeds of the first rotating arm 230 and the second rotating arm 410. Specifically, the first sliding groove 233 includes a first segment 2331 and a second segment 2333 that are continuous, and the second sliding groove 411 includes a third segment 4111 and a fourth segment 4113 that are continuous. Extension directions of the third segment 4111 and the fourth segment 4113 are the same, that is, the entire second sliding groove 411 extends in a same straight-line direction. Angles of the first segment 2331 and the second segment 2333 in the first sliding groove 233 are set, so that relative motion speeds of the first rotating arm 230 and the second rotating arm 410 are controlled. In this way, design difficulty can be reduced, and the second rotating arm 410 can move more smoothly.

When the first housing 050*a* and the second housing 050*b* are unfolded, the two second rotating arms 410 are located in the first relative location. When the first housing 050*a* and the second housing 050*b* are folded, the two second rotating arms 410 are located in the second relative location. In a process in which the two first rotating arms 230 rotate relative to each other to enable the two second rotating arms 410 to switch from the first relative location to the second relative location, the first sliding block 311 moves from an end that is of the first segment 2331 and that is away from the second segment 2333 to an end that is of the second segment 2333 and that is away from the first segment 2331, and the second sliding block 313 moves from an end that is of the third segment 4111 and that is away from the fourth segment 4113 to an end that is of the fourth segment 4113 and that is away from the third segment 4111.

When the first sliding block 311 moves in the first segment 2331, the second sliding block 313 moves in the third segment 4111. In this case, the rotation speed of the first rotating arm 230 is approximately equal to the rotation speed of the second rotating arm 410. Specifically, a difference between the rotation speed of the first rotating arm 230 and the rotation speed of the second rotating arm 410 is not greater than 5%, so that the middle frame 053 driven by the first rotating arm 230 and the casing 051 driven by the second rotating arm 410 have approximately same rotation speeds. Therefore, when the first sliding block 311 moves in the first segment 2331 and the second sliding block 313 moves in the third segment 4111, the first middle frame 053*a* may be kept parallel to the first backplane, and the second middle frame 053*b* may be kept parallel to the second backplane. In this case, effect of the user's field of view is that the flexible display 010 fastened to the surface of the middle frame 053 synchronously moves with the casing 051, and a folding process of the entire electronic device appears to be quite smooth.

When the first sliding block 311 enters the second segment 2333, the second sliding block 313 enters the fourth segment 4113. When the first sliding block 311 moves in the second segment 2333, and the second sliding block 313 moves in the fourth segment 4113, the rotation speed of the first rotating arm 230 is greater than the rotation speed of the second rotating arm 410. In this way, when the first rotating arm 230 rotates by a specific angle, the second rotating arm 410 rotates by a smaller angle. In other words, when the second rotating arm 410 rotates by a specific angle, the first rotating arm 230 rotates by a larger angle.

When the second rotating arm 410 drives the casing 051 to rotate to fold, the first casing 051*a* and the second casing 051*b* are in contact and accommodate the flexible display 010. In this case, the second rotating arm 410 moves from the first relative location to the second relative location by an angle of approximately 90 degrees. In other words, one second rotating arm 410 drives the first casing 051*a* to rotate by approximately 90 degrees, the other second rotating arm 410 drives the second casing 051*b* to rotate by approximately 90 degrees, and the first casing 051*a* and the second casing 051*b* change from an unfolded state to a folded state. Because a rotation speed difference exists between the first rotating arm 230 and the second rotating arm 410, and the middle frame 053 rotativity fits the casing 051, an angle at which the second rotating arm 410 drives the middle frame 053 to rotate is greater than 90 degrees, so that the first middle frame 053*a* and the second middle frame 053*b* are in an open state in a direction from being away from the base 100 to being close to the base 100. However, a bending angle with a large radius can exist in a bending location of the flexible display 010, namely, a location that is of the flexible display 010 and that is close to the base 100, so that curvature of a part of the flexible display 010 is reduced. This can reduce a wrinkle of the flexible display 010, and alleviate a light shadow phenomenon of a crease of the flexible display 010.

In addition, because the first rotating arm 230 is rotativity connected to the fastener 210 in the forms of the arc groove 231 and the arc block 211, the flexible display 010 may be further close to the base 100. Compared with a form in which the first rotating arm 230 is rotativity connected to the fastener 210 through a physical rotating shaft, the forms of the arc groove 231 and the arc block 211 can avoid a problem that a location conflict occurs between the flexible display 010 and the physical rotating shaft.

It may be understood that the first sliding part and the second sliding part may be alternatively set as follows: the first sliding part is the first sliding block 311, and the second sliding part is the first sliding groove 233. Similarly, a relative motion of the first rotating arm 230 and the guiding block 310 may be controlled.

It may be understood that the third sliding part and the fourth sliding part may be alternatively set as follows: the third sliding part is the second sliding groove 411, and the fourth sliding part is the second sliding groove 411. Similarly, a relative motion of the second rotating arm 410 and the guiding block 310 may be controlled.

A driving sequence of the electronic device may be alternatively understood as a reverse sequence. To be specific, the second rotating arm 410 drives a motion of the guiding block 310 by using the fit between the third sliding part and the fourth sliding part, and the guiding block 310 drives a motion of the first rotating arm 230 by using the fit between the first sliding part and the second sliding part.

Two groups of first driving parts 200, two groups of guiding parts 300, and two groups of second driving parts 400 are disposed in the electronic device and correspond to two ends of the base 100. The two groups of first driving parts 200, the two groups of guiding parts 300, and the two groups of second driving parts 400 enable the casing 051 and the middle frame 053 to bear more balanced forces. The second rotating arm 410 of each of the two groups of second driving parts 400 is fastened through a door plate 500. To be specific, the second rotating arm 410 that is of the two groups of second driving parts 400 and that is close to the first housing 050*a* is fastened through one door plate 500, and the second rotating arm 410 that is of the two groups of second driving parts 400 and that is close to the second housing 050*b* is fastened through the other door plate 500. This improves integrity of the two groups of second driving parts 400 and can improve strength of the second rotating arm 410.

Refer to FIG. 4, the rotating shaft mechanism 030 further includes a synchronization assembly. The synchronization assembly includes two synchronization gears 610 and two linkage gears 630. The synchronization gear 610 and the guiding block 310 are integrally formed, and an axis of the synchronization gear 610 is coaxial with a rotating shaft of the guiding block 310, that is, the guiding block 310 rotates around the axis of the synchronization gear 610. For ease of description, the synchronization gear 610 close to the first housing 050*a* is named a first synchronization gear 610, and the synchronization gear 610 close to the second housing 050*b* is named a second synchronization gear 610. The linkage gear 630 close to the first housing 050*a* is named a first linkage gear 630, and the linkage gear 630 close to the second housing 050*b* is named a second linkage gear 630.

The two linkage gears 630 are located between the two synchronization gears 610, the first synchronization gear 610 is engaged with the first linkage gear 630, the first linkage gear 630 is engaged with the second linkage gear 630, and the second linkage gear 630 is engaged with the second synchronization gear 610. The fastener 210 is provided with two jacks, and the linkage gear 630 rotativity fits the fastener 210 by using the jack on the fastener 210. The first installation base 110 is also provided with a jack corresponding to the linkage gear 630, and the linkage gear 630 rotativity fits the first installation base 110 by using the jack on the first installation base 110. In addition, the first installation base 110 and the base 100 can be fastened in a relative location by using the fastener 210 and the linkage gear 630. The first installation base 110 is further provided with a jack corresponding to the synchronization gear 610, and the synchronization gear 610 rotativity fits the first installation base 110 by using the jack on the first installation base 110, that is, the synchronization gear 610 rotativity fits the base 100.

When the first synchronization gear 610 rotates, the first linkage gear 630 rotates, the first linkage gear 630 drives the second linkage gear 630 to rotate, and the second linkage gear 630 drives the second synchronization gear 610 to rotate. Because there are an even quantity of linkage gears 630 between the first synchronization gear 610 and the second synchronization gear 610, rotation directions of the first synchronization gear 610 and the second synchronization gear 610 are exactly opposite. Therefore, when one guiding block 310 is rotated, the other guiding block 310 may synchronously and reversely rotate.

The synchronization assembly enables the two guiding blocks 310 to synchronously and reversely rotate. Correspondingly, the two first rotating arms 230 also synchronously and reversely rotate, the two second rotating arms 410 also synchronously and reversely rotate, the first casing 051*a* and the second casing 051*b* synchronously and reversely rotate, and the first middle frame 053*a* and the second middle frame 053*b* synchronously and reversely rotate.

The two synchronization gears 610 and the two linkage gears 630 are disposed, so that a reference circle diameter of each gear may be designed to be small, and installation cavity space of the base 100 is appropriately used.

It may be understood that a quantity of linkage gears 630 may alternatively be four, six, or another even number, so that the two synchronization gears 610 can synchronously and reversely rotate.

Figure 8:
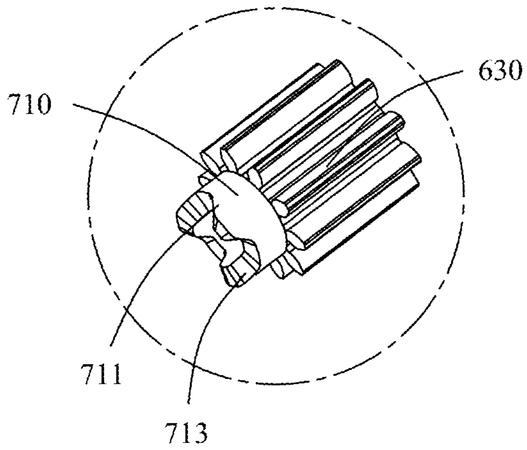
FIG. 8 is a partially enlarged diagram of a region A in FIG. 4.

FIG. 8 is a partially enlarged diagram of a region A in FIG. 4.

Figure 9:
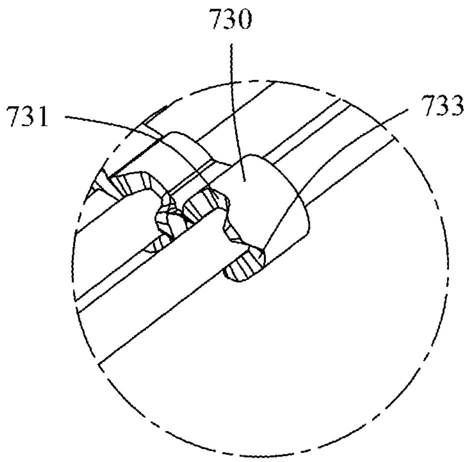
FIG. 9 is a partially enlarged diagram of a region B in FIG. 4.

FIG. 9 is a partially enlarged diagram of a region B in FIG. 4.

Refer to FIG. 4. The rotating shaft mechanism 030 further includes a damping assembly, where the damping assembly is connected to the guiding block 310, and is configured to provide a damping force when the two guiding blocks 310 rotate relative to each other. Specifically, the damping assembly includes a first cam member 710, a second cam member 730, and an elastic damping member 750. Refer to FIG. 8. A first protrusion 711 and a second protrusion 713 are disposed on a surface that is of the first cam member 710 and that faces the second cam member 730. Refer to FIG. 9. A first groove 731 and a second groove 733 are disposed on the second cam, the first groove 731 fits the first protrusion 711, and the second groove 733 fits the second protrusion 713.

Refer to FIG. 4. The first cam member 710 drivingly fits the guiding block 310. When the guiding block 310 rotates, the first cam member 710 synchronously rotates. The second cam member 730 fits the first installation base 110 in a circumferential location-limiting manner, and the second cam member 730 can be relatively close to or away from the first cam member 710. The elastic damping member 750 is a compression spring. One end of the elastic damping member 750 acts on the second cam member 730, the other end acts on a second installation base 130, and the second installation base 130 is fastened to the base 100. An elastic force of the elastic damping member 750 acts on the second cam member 730, so that the second cam member 730 tends to be close to the first cam member 710.

Specifically, adjacent second cam members 730 are fastened, and each second cam member 730 corresponds to one linkage gear 630 or one synchronization gear 610. Therefore, rotating shafts of any two second cam members 730 are parallel but not coaxial. After all second cam members 730 are fastened, any second cam member 730 cannot rotate around an axis of the second cam member 730, but may slide along the axis of the second cam member 730.

When the two second rotating arms 410 are located in the first relative location, the first protrusion 711 is located in the first groove 731. In a process in which the two second rotating arms 410 relatively rotate from the first relative location to the second relative location, the first protrusion 711 slides out of the first groove 731, and the elastic force provided by the elastic damping member 750 is converted into a damping force that prevents the first protrusion 711 from sliding out of the first groove 731. This can improve use experience when the user folds the electronic device.

When the two second rotating arms 410 are located in the second relative location, the second protrusion 713 is located in the second groove 733. In a process in which the two second rotating arms 410 relatively rotate from the second relative location to the first relative location, the second protrusion 713 slides out of the second groove 733, and the elastic force provided by the elastic damping member 750 is converted into a damping force that prevents the second protrusion 713 from sliding out of the second groove 733. This can improve use experience when the user unfolds the electronic device.

The electronic device further includes two elastic screen members 800, and the elastic screen member 800 is a compression spring. One end of the elastic screen member 800 is connected to the guiding block 310, and the other end is connected to the middle frame 053. The elastic screen member 800 enables the middle frame 053 to tend to be away from the guiding block 310. Under an action of the guiding groove, the middle frame 053 can move relative to the casing 051, and be relatively close to or away from the guiding block 310 to a specific extent.

When the flexible display 010 is installed on the middle frame 053, the flexible display 010 may be fastened in a location that is of the middle frame 053 and that is relatively close to the guiding block 310, and then the middle frame 053 is away from the guiding block 310 by using elasticity of the elastic screen member 800. In this process, the flexible display 010 is unfolded, to reduce the wrinkle of the flexible display 010.

It may be understood that the rotating shaft 055 may alternatively slide relative to the casing 051 without using the guiding groove. A sliding block may be disposed on the casing 051, and the sliding block can slide on the casing 051 to be close to or away from the rotating shaft mechanism 030. The rotating shaft 055 rotativity fits the sliding block, to implement relative displacement between the rotating shaft 055 and the casing 051.

The two housings 050 in the electronic device control rotation by using the rotating shaft mechanism 030, so that the casing 051 and the middle frame 053 have different rotation angles. The middle frame 053 is connected to the flexible display 010. When the two casings 051 rotate to fold, that is, the two casings 051 have an included angle of 180 degrees, because the rotation angle of the middle frame 053 is greater than the rotation angle of the casing 051, the flexible display 010 in the middle frame 053 has an included angle greater than 180 degrees at a bending position, and the middle frame 053 and the casing 051 rotate by a specific angle to match an angle difference between the casing 051 and the middle frame 053, so that the flexible display 010 can implement smooth transition at the bending position. This reduces the wrinkle of the flexible display 010, and alleviates the light shadow phenomenon of the crease of the flexible display 010.

The foregoing descriptions are merely specific implementations of this application, but are not intended to limit the protection scope of this application. Any variation or replacement within the technical scope disclosed in this application shall fall within the protection scope of this application.

What is claimed is:

1. A rotating shaft mechanism of a foldable electronic device, wherein the foldable electronic device comprises a flexible display and two housings, the housing comprises a casing and a middle frame, the casings are rotatively connected, the middle frame is rotatively connected to the casing, the flexible display is laid on a surface of the middle frame, and the rotating shaft mechanism comprises:

a base;

a first driving part, comprising a fastener and two first rotating arms, wherein the two first rotating arms are distributed on two sides of the base, the fastener is fastened to the base, one end of each first rotating arm is rotatively connected to the fastener, the other end is configured to be fastened to the middle frame, and the first rotating arm comprises a first sliding part;

a guiding part, comprising two guiding blocks, wherein the two guiding blocks are distributed on two sides of the base, each guiding block is rotatively connected to the base, each guiding block corresponds to one first rotating arm on a same side, the guiding block comprises a second sliding part in slidable fit with the first sliding part, the first sliding part and the second sliding part fit to guide a relative motion of the guiding block and the first rotating arm, and the guiding block further comprises a third sliding part; and a second driving part, comprising two second rotating arms, wherein the second rotating arm is configured to be fastened to the casing, the two second rotating arms are distributed on the two sides of the base, each of the two second rotating arms corresponds to one guiding block on a same side, the second rotating arm comprises a fourth sliding part in slidable fit with the third sliding part, and the third sliding part and the fourth sliding part fit to guide a relative motion of the guiding block and the second rotating arm, wherein when the two second rotating arms relatively rotate from a first relative location to a second relative location, the two casings are switchable from an unfolded state to a folded state, the guiding part drives the two first rotating arms to rotate relative to each other, and relative rotation angles of the two first rotating arms are greater than relative rotation angles of the two second rotating arms; and when the two casings are unfolded, the middle frames are disposed on a same surface, and when the two casings are folded, the middle frames are expanded at an end proximate to the base.

2. The rotating shaft mechanism according to claim 1, wherein the first rotating arm is provided with an arc groove, and the fastener is provided with an arc block; and the arc block is in slidable fit with the arc groove, to enable the first rotating arm to be rotatively connected to the fastener.

3. The rotating shaft mechanism according to claim 1, wherein one of the first sliding part and the second sliding part is a first sliding groove, and the other is a first sliding block; and one of the third sliding part and the fourth sliding part is a second sliding groove, and the other is a second sliding block.

4. The rotating shaft mechanism according to claim 3, wherein the first sliding groove comprises a first segment and a second segment that are consecutive, and the second sliding groove comprises a third segment and a fourth segment that are consecutive;

when the two second rotating arms rotate relative to each other to enable ends that are of the two second rotating arms and that are away from each other to be relatively close to each other, the first sliding block enters the second segment from the first segment, and the second sliding block enters the fourth segment from the third segment; and the first sliding groove and the second sliding groove are disposed as follows:

when the first sliding block slides in the first segment, the second sliding block slides in the third segment, and a rotation speed of the first rotating arm is equal to a rotation speed of the second rotating arm.

5. The rotating shaft mechanism according to claim 4, wherein when the first sliding block slides in the third segment, the second sliding block slides in the fourth segment, to enable relative rotation speeds of the two first rotating arms to be greater than relative rotation speeds of the two second rotating arms.

6. The rotating shaft mechanism according to claim 1, further comprising a synchronization assembly, wherein the synchronization assembly is connected to the two guiding blocks through transmission, and is configured to implement synchronous reverse rotation of the two guiding blocks.

7. The rotating shaft mechanism according to claim 6, wherein the synchronization assembly comprises two engaged synchronization gears; and the two engaged synchronization gears are in a one-to-one correspondence with the two guiding blocks, and the two engaged synchronization gears are fastened to the corresponding guiding blocks.

8. The rotating shaft mechanism according to claim 7, wherein the synchronization assembly further comprises an even quantity of linkage gears, and the two engaged synchronization gears are engaged by using the even quantity of linkage gears.

9. The rotating shaft mechanism according to claim 1, further comprising a damping assembly connected to the guiding block through transmission, wherein the damping assembly is configured to provide a damping force when the two guiding blocks rotate relative to each other.

10. The rotating shaft mechanism according to claim 9, wherein the damping assembly comprises a first cam member, a second cam member, and an elastic damping member;

a first protrusion is disposed on a surface of the first cam member that faces the second cam member, and a first groove that fits the first protrusion is disposed on the second cam;

one of the first cam member and the second cam member is connected to the base in a circumferential location-limiting manner, the other drivingly fits the guiding block and is capable of synchronously rotating with the guiding block;

the elastic damping member is configured to provide an elastic force for the first cam member and the second cam member to be proximate to each other; and in a process in which the two second rotating arms relatively rotate from the first relative location to the second relative location, the first protrusion slides out of the first groove.

11. The rotating shaft mechanism according to claim 1, wherein the rotating shaft mechanism further comprises two elastic screen members, one end of the elastic screen member is connected to the guiding block, the other end is configured to be connected to the middle frame, and the elastic screen member enables the middle frame to be away from the guiding block.

12. An electronic device, comprising a flexible display, two housings, and a rotating shaft mechanism, wherein the two housings each comprises a casing and a middle frame, the casings are rotatively connected, and the middle frame is rotatively connected to the casing;

one part of the flexible display is connected to one middle frame, and the other part is connected to the other middle frame;

one first rotating arm in the rotating shaft mechanism is fastened to one middle frame, and the other first rotating arm is fastened to the other middle frame; and one second rotating arm in the rotating shaft mechanism is fastened to one casing, and the other second rotating arm is fastened to the other casing; and wherein the rotating shaft mechanism comprises:

a base;

a first driving part, comprising a fastener and two first rotating arms, wherein the two first rotating arms are distributed on two sides of the base, the fastener is fastened to the base, one end of each first rotating arm is rotatively connected to the fastener, the other end is configured to be fastened to the middle frame, and the first rotating arm comprises a first sliding part;

a guiding part, comprising two guiding blocks, wherein the two guiding blocks are distributed on two sides of the base, each guiding block is rotatively connected to the base, each guiding block corresponds to one first rotating arm on a same side, the guiding block comprises a second sliding part in slidable fit with the first sliding part, the first sliding part and the second sliding part fit to guide a relative motion of the guiding block and the first rotating arm, and the guiding block further comprises a third sliding part; and a second driving part, comprising two second rotating arms, wherein the second rotating arm is configured to be fastened to the casing, the two second rotating arms are distributed on the two sides of the base, each of the two second rotating arms corresponds to one guiding block on a same side, the second rotating arm comprises a fourth sliding part in slidable fit with the third sliding part, and the third sliding part and the fourth sliding part fit to guide a relative motion of the guiding block and the second rotating arm, wherein when the two second rotating arms relatively rotate from a first relative location to a second relative location, the casings are switchable from an unfolded state to a folded state, the guiding part drives the two first rotating arms to rotate relative to each other, and relative rotation angles of the two first rotating arms are greater than relative rotation angles of the two second rotating arms; and when the two casings are unfolded, the middle frames are disposed on a same surface, and when the two casings are folded, the middle frames are expanded at an end proximate to the base.

13. The electronic device according to claim 12, wherein the housing further comprises a rotating shaft; and the rotating shaft is rotatively disposed at an end that is of the casing and that is away from the rotating shaft mechanism, and the middle frame rotatively fits the rotating shaft.

14. The electronic device according to claim 12, wherein the first rotating arm is provided with an arc groove, and the fastener is provided with an arc block; and the arc block is in slidable fit with the arc groove, to enable the first rotating arm to be rotatively connected to the fastener.

15. The electronic device according to claim 12, wherein one of the first sliding part and the second sliding part is a first sliding groove, and the other is a first sliding block; and one of the third sliding part and the fourth sliding part is a second sliding groove, and the other is a second sliding block.

16. The electronic device according to claim 15, wherein the first sliding groove comprises a first segment and a second segment that are consecutive, and the second sliding groove comprises a third segment and a fourth segment that are consecutive;

when the two second rotating arms rotate relative to each other to enable ends that are of the two second rotating arms and that are away from each other to be relatively close to each other, the first sliding block enters the second segment from the first segment, and the second sliding block enters the fourth segment from the third segment; and the first sliding groove and the second sliding groove are disposed as follows:

when the first sliding block slides in the first segment, the second sliding block slides in the third segment, and a rotation speed of the first rotating arm is equal to a rotation speed of the second rotating arm.

17. The electronic device according to claim 16, wherein when the first sliding block slides in the third segment, the second sliding block slides in the fourth segment, to enable relative rotation speeds of the two first rotating arms to be greater than relative rotation speeds of the two second rotating arms.

18. The electronic device according to claim 12, wherein the rotating shaft mechanism further comprises a synchronization assembly, wherein the synchronization assembly is connected to the two guiding blocks through transmission, and is configured to implement synchronous reverse rotation of the two guiding blocks.

19. The electronic device according to claim 18, wherein the synchronization assembly comprises two engaged synchronization gears; and the two engaged synchronization gears are in a one-to-one correspondence with the two guiding blocks, and the two engaged synchronization gears are fastened to the corresponding guiding blocks.

20. The electronic device according to claim 19, wherein the synchronization assembly further comprises an even quantity of linkage gears, and the two engaged synchronization gears are engaged by using the even quantity of linkage gears.

* * * * *